Oct. 16, 1951 — E. HERVEY — 2,571,362
FOLDABLE CANOPY FRAME
Filed Sept. 28, 1946 — 2 Sheets-Sheet 1
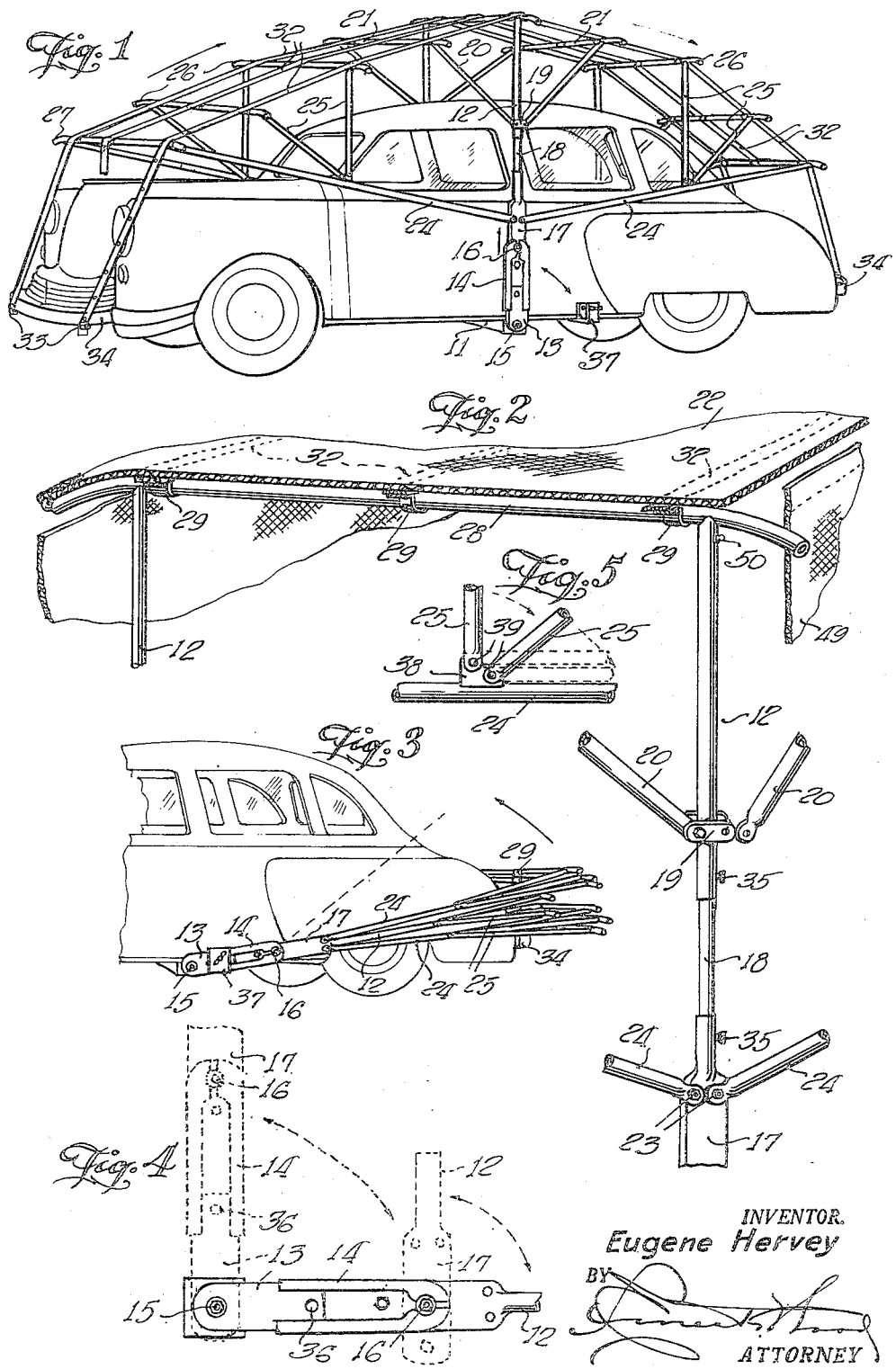
INVENTOR.
Eugene Hervey Oct. 16, 1951 — E. HERVEY — 2,571,362
FOLDABLE CANOPY FRAME
Filed Sept. 28, 1946 — 2 Sheets-Sheet 2
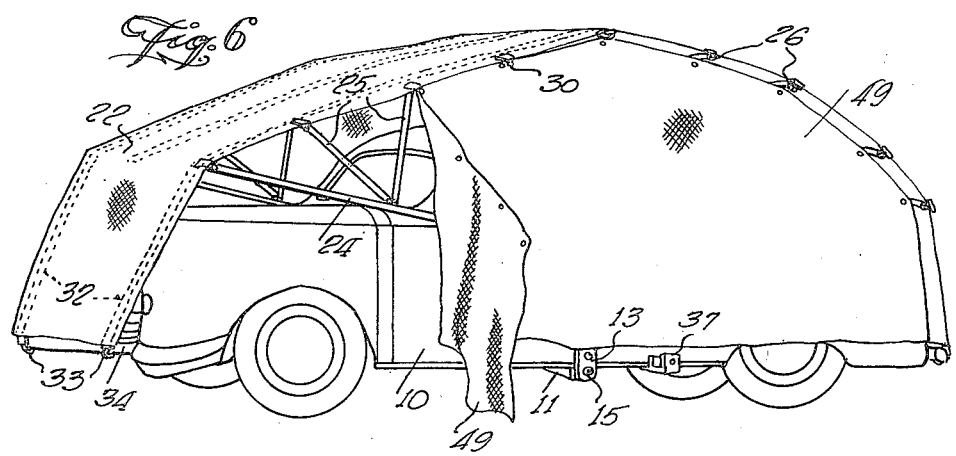
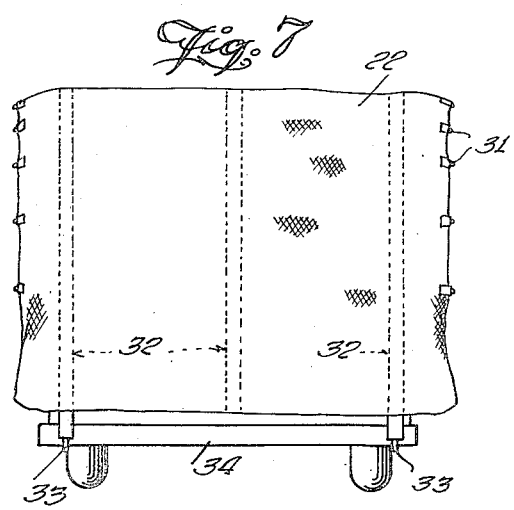
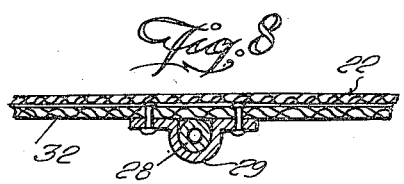
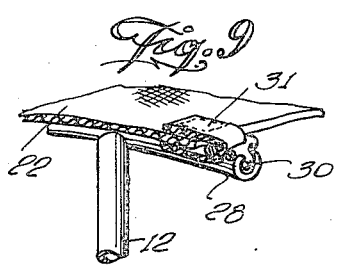
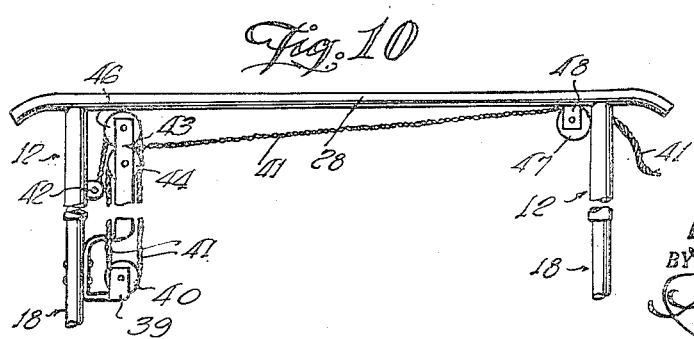
INVENTOR.
Eugene Hervey
BY
ATTORNEY Patented Oct. 16, 1951

2,571,362

UNITED STATES PATENT OFFICE 2,571,362

FOLDABLE CANOPY FRAME

Eugene Hervey, Dallas, Tex.

Application September 28, 1946, Serial No. 700,041

6 Claims. (Cl. 135—4)

1

This invention relates to collapsible canopy frames for automobiles and more particularly such frames for supporting a canopy to wholly enclose an automobile to protect the latter from the elements.

The principal object of the invention is to provide a collapsible canopy frame consisting of a main supporting member made up of telescopically related parts for longitudinal adjustment, said supporting member being pivoted to a mounting extending across the underside of the automobile frame and secured thereto whereby the main supporting member may fold rearwardly, along with companion canopy supporting bows, the group of bows or members being adapted to lie in folded position in any preselected plane at the rear of the vehicle on which the frame is mounted.

Another object of the invention is to provide a foldable frame for supporting a protective canopy on vehicles in which the pivotable point of the main supporting member of the frame may be displaced rearwardly of the pivotable point by which said member is connected to the mounting bar pending transversely beneath the plane of the vehicle, such displacement being provided for to remove the main supporting member to a position where it will not interfere with the opening of the rear door of the automobile on which the frame is mounted. Supplementing this feature of the invention, there is provided a medium, consisting of telescopically related parts, by which the main frame supporting member may be reduced in length in its reclining position to correspond with the length of the companion, canopy supporting members or bows.

Another object of the invention is to provide a collapsible canopy frame for vehicles in which the main supporting member and the companion canopy supporting bows are joined flexibly together in order that they may be collectively moved from a collapsed position to an extended position to overlie the upper portion of a vehicle on which the frame is mounted, in such manner that the roof portion of the canopy, which is preferably a permanent part of the assembly, to overlie the automobile from one end to the other, the flexible connecting means for the bows being capable of securement under tension to the front and rear bumpers of the automobile to hold the frame in said extended position. Provision is further made for maintaining tension transversely on the canopy roof to prevent sagging and collection of rain water and to offset the damage which may be caused by hail storms and other missiles which may otherwise fall on the vehicle concealed by the canopy.

Another object of the invention is to provide mechanism through the medium of which an operator standing at one side of the vehicle may raise and lower both of the centrally disposed, main supporting members of the frame.

With the foregoing and other objects in view, the invention has particular reference to certain features of accomplishment which will become apparent as the description proceeds, taken in connection with the accompanying drawing wherein:

Figure 1 is a front perspective view of an automobile on which the collapsible frame of the present invention is mounted and shown in extended position.

Figure 2 is a fragmentary perspective view of the collapsible frame showing the manner in which the roof portion and side curtains of the canopy are mounted on the frame.

Figure 3 is a fragmentary perspective view of an automobile showing the canopy frame in folded or collapsed position.

Figure 4 is a fragmentary detail view of the extendable lower end of the main frame supporting member, illustrating its displaceable pivotable point.

Figure 5 is a fragmentary detail view showing the connection of certain of the canopy supporting bows to the sub-frame members.

Figure 6 is a view similar to Figure 1 but showing the roof and side curtains of the canopy in position on the frame, one of said curtains being displaced to illustrate the frame thereunder.

Figure 7 is a rear elevational view of the canopy and frame mounted on a vehicle.

Figure 8 is a fragmentary detail view showing the manner in which the canopy roof is connected to the frame.

Figure 9 is a fragmentary perspective view showing the means by which transverse tension is imposed on the canopy roof, and Figure 10 is a fragmentary view of the frame in transverse section, showing the mechanism by which one of the main frame supporting members is moved upwardly and downwardly from a position opposite thereto.

Continuing with a more detailed description of the drawings, reference is primarily made to Figure 1 wherein numeral 10 denotes an automobile on which is mounted, below the plane thereof, a bar 11, which serves as a mounting for the entire frame of the invention. This bar may be adjustable or it may be permanently mounted to the frame of the automobile on the underside thereof. The end of the bar extends slightly beyond the sides of the frame in order to provide a pivotal point for the lower end of the main supporting member 12 of the frame.

The main frame supporting member 12 consists of two telescopically related parts 13 and 14 at its lower end, the parts 13 consisting of an arm, one end of which is pivoted at 15 to the extended end of the bar 11, said part 13 slidably entering the part 14, to one end of which is pivoted at 16 the lower extremity of the member 12, which is identified in Figures 2 and 4 by reference numeral 17. The upper portion of the supporting member 12 is joined to the lower portion 17 thereof by means of an intermediate member 18, which telescopes with the upper and lower portions of the main supporting member 12 and thereby enables the said main supporting member as a whole to be increased or decreased in length, for the purpose to be hereinafter made clear.

Adjacent the lower end of the upper portion of the member 12 is a pair of parallel links 19 to which are pivoted a pair of arms 20 which, when the frame is in extended position, extend angularly upward where they support a cross-member 21, the said arms 20 and cross-member 21 serving in the capacity of a bow, for supporting the room 22 of the canopy, which is preferably a permanent part of the frame and is collapsed with the frame when the latter is in the folding position shown in Figure 3.

Pivoted at 23 to the lower portion 17 of the main support 12 is a pair of arms 24 which are in fact sub-frames because they extend forwardly and rearwardly of the automobile 10, to support auxiliary bows consisting of the arms 25 and cross-members 26 above the front and rear of the vehicle 10. Moreover, the sub-frames 24 carry similar cross-members 27 at their outer ends and which cross-members extend across the front and rear of the vehicle.

An examination of Figure 2 will reveal that the cross-member 28, which joins the supporting members 12, as are the remaining cross-members or bows previously referred to, is preferably of tubular stock having open ends. When the roof portion of the canopy 22 is affixed by means of the U-shaped clip 29, to the cross-members, a tensioning means such as shown in Figure 9 is put into effect to tighten the roof 22 transversely across the top of the frame. This tensioning means consists of a hook 30, having a bifurcated body 31 which embraces the edge of the canopy roof 22. The hook 30 enters the open ends of the cross-members 28 in the manner shown and for the purpose described.

Connecting each of the bows or cross-members of the frame flexibly together are straps 32, one extending the length of the frame, midway between the ends of the cross-members or bows while the others extend parallel to the first one, adjacent the outer ends of the said cross-members. These straps further extend beyond the ends of the frame, and are connected at 33 to the bumpers 34 of the vehicle.

By securing the straps 32 under tension to the bumpers 34 of the vehicle, the canopy roof 22 is stretched tightly, which serves to hold the various parts of the frame against dislocation or rattling. Moreover, with the lateral tensioning means afforded by the hooks 30 just described, the roof 22 is held against sagging which creates depressions and collects rainwater.

Referring again to the main supporting member 12, it is pointed out that the intermediate member 18 thereof provides for extending or lowering the said main supporting members to correspond with the length of an automobile as compared to the height thereof and further insures proper positioning and collapsing of the angular arms 20 which are pivoted to the upper portion thereof. Set screw 35 (Figure 2) secures the parts 12, 17 and 18 in adjusted position. The distance from the center to the rear of most modern makes of automobiles is greater than the height of the vehicle. This necessitates a reduction in the length or height of the main supporting members 12, when these members are in operative or vertical position. Conversely, when the frame is in collapsed position, which may be at any angle desired towards the rear of the vehicle, the main frame members 12 must be lengthened to correspond in length to the companion, folded members 24 and the sub-members 25. The provision for telescoping the main body of the supporting members 12 therefore compensates for any variations in length of these members in relation to the companion members.

In some cases, it may be desired to dispose the folded frame, made up of the members 12, 24 and the auxiliary folds, in a plane at substantially 45° with respect to the major axis of the automobile frame. The arrangement shown in Figure 4 makes this possible yet disposing the portion 17 of the main frame 12 in such position that it will not interfere with the opening of the rear door of the automobile. The telescoping members 13 and 14, previously referred to, have aligned apertures 36 through which a bolt or pin is passed to secure the members 13 and 14 against longitudinal displacement after adjustment thereof. When the members 13 and 14 are disposed in the horizontal position shown in Figure 4, the portion 14 will rest in a U-shaped support 37, shown in Figure 1 as extending outwardly from the automobile frame. When thus afforded, the main frame members 12 may be disposed either vertically or at any angular plane desired but when situated in the position shown in Figure 3, adjustment of the members 13 and 14 with respect to each other may be necessary in order that the main frame members 12 will correspond in length to the companion frame members 24.

In Figure 5 is shown a typical pivotal mounting for auxiliary bows 25 in relation to the sub-frame members 24. This mounting consists of a plate 38 having offset pivotal points 39 and to which the auxiliary bows or arms 25 are attached in order that when these arms are in folded position in relation to the sub-frame 24, they will lie parallel therewith.

In Figure 10 is shown fragmentarily the main frame supporting members 12 and the transverse member 28 thereof, serving as one of the bows of the frame. This mechanism consists of a bracket 39, attached to the intermediate telescoping member 18, which carries a pulley 40, under which passes the lower bight of an operating cable 41. An anchorage 42 is provided for the end of cable 41, on the upper sliding portion of the main frame supporting member 12. A second pulley 44 is mounted in the upper portion 45 of bracket 39 and above this pulley is a third pulley 46.

The cable 41, being anchored at 42, passes over pulley 46, thence downwardly under pulley 40, thence upwardly and over the intermediate pulley 44. The cable 41 then extends across the top of the collapsible frame, thence over a third roller 47 on the opposite side of the frame, which is mounted in a bracket 48, attached to the cross-member 28 of the frame. It is apparent that by pulling on the free end of the cable 41, a pull is exerted on the opposite end of the cable which is secured at 42. Since the cable passes under the roller 40 which is affixed to the intermediate member 18, the slidable upper portion of the main frame supporting member 12 will be caused to move upwardly, thus increasing the height of the frame at its mid-section. The described arrangement enables one person to effect height adjustment of the frame but in raising the far side of the frame by pulling on the cable 41, it is necessary that the frame supporting member 12 on the near side be raised by hand simultaneously with the raising of the companion frame member 12 by the cable.

It is apparent from the foregoing that the collapsible frame and canopy of the present invention may find many adaptations such for example as affording temporary shelter for an automobile against hail, rain, sand storms and the effects of the sun's rays as well as affording a general protection for a new automobile when the latter is being transported overland from a manufacturer to a distributor and otherwise. Examination of the automobile concealed by the canopy and frame, may be periodically made by releasing portions of the side curtains 49, which are snapped into position by means of fasteners 50 (Figure 2) and, for purposes of drainage the roof portion 22, the side curtains 29 are disposed well inwardly of the extended ends of the cross-members 26, 27 and 28.

Manifestly, the construction as shown and described is capable of some modification and such modification as may be construed to fall within the scope and meaning of the appended claims is also considered to be within the spirit and intent of the invention.

What is claimed is:

1. A collapsible canopy frame including a pair of main frame supporting members, each having extensible midsections and an extensible lower section, means below the frame for pivotally supporting the lower extensible sections of said frame supporting members, sub-frame members pivoted to the extensible lower sections of said main frame supporting members, a pair of arms pivoted to each of said main supporting members, auxiliary arms pivoted to said sub-frame members, cross-members carried by each pair of said arms, a canopy roof permanently secured to and foldable with said cross-members, side curtains removably attached to said frame and means for holding said frame in extended position.

2. A collapsible canopy frame including a pair of main frame supporting members, each having an extensible end and midsection, a mounting element to which the extensible ends of each of said main frame supporting members are pivotally attached, a pair of sub-frame members pivoted to each of said main frame supporting members, arms pivoted to each of said sub-frame members, cross-members connecting the ends of the sub-frame members and arms on one side of said canopy frame to companion sub-frame members and arms on the opposite side thereof to support a fabric roof, means on selected members of said frame for sustaining fabric sides of said roof, means for maintaining extended relationship of said frame members and arms and means for supporting said canopy frame in collapsed position.

3. A foldable frame for supporting a fabric cover including a pair of extensible main frame supporting members, a mounting for said frame, to the ends of which are pivotally attached the lower ends of said main frame supporting members, sub-frame members pivoted to said main frame supporting members, a plurality of pairs of arms pivoted to said main frame supporting members and said sub-frame members, cross-members carried by each pair of said arms, a fabric roof supported by and foldable with said cross-members, means on selected members of said frame for detachably sustaining fabric side panels of said cover, parallel, coextensive straps extending transversely across said cross-members and attached thereto adjacent the ends of the latter, said straps adapted to be anchored at their ends beyond each end of said foldable frame for holding said frame members in extended relationship.

4. The structure set forth in claim 3, further defined in that the body of the main frame supporting member is composed of telescopically related sections and telescoping end members, to one of which latter is pivoted the lower end of said main frame supporting members, the other of said telescoping end members being pivoted to the mounting for said main frame supporting member whereby pivotal displacement and length adjustment of said main frame supporting member is effected in relation to its mounting.

5. The structure recited in claim 3, further defined in that the means supporting the roof of the cover consist of hollow, tubular members whose ends extend beyond the sides of the foldable frame, and means secured to said roof and receivable in the open ends of said tubular members for maintaining lateral tension on said roof.

6. A foldable frame as set forth in claim 3, further defined in that the frame supporting members, sub-frame members and arms are foldable to lie in relative parallelism.

EUGENE HERVEY.

REFERENCES CITED

The following references are of record in the file of this patent:

UNITED STATES PATENTS

| Number | Name | Date |
| --- | --- | --- |
| 820,059 | Miles | May 8, 1906 |
| 1,200,556 | West | Oct. 10, 1916 |
| 1,231,735 | Harris | July 3, 1917 |
| 1,520,486 | Sodemann | Dec. 23, 1924 |
| 1,527,908 | Noble | Feb. 24, 1925 |

FOREIGN PATENTS

| Number | Country | Date |
| --- | --- | --- |
| 221,489 | Switzerland | Aug. 17, 1942 |